US005713384A

United States Patent [19]

Roach et al.

[11] Patent Number: 5,713,384

[45] Date of Patent: Feb. 3, 1998

[54] TABLETED DETERGENT, METHOD OF MANUFACTURE AND USE

[75] Inventors: Kenneth James Roach, Canton; Patricia Anne Anderson, Northville, both of Mich.

[73] Assignee: Unilever N.V., Rotterdam, Netherlands

[21] Appl. No.: 625,353

[22] Filed: Apr. 1, 1996

Related U.S. Application Data

[62] Division of Ser. No. 430,177, Apr. 27, 1995, Pat. No. 5,552,079.

[51] Int. Cl.[6] .......... B01D 11/02

[52] U.S. Cl. .......... 137/1; 137/268; 510/446; 422/277

[58] Field of Search .......... 137/268, 1; 510/446; 422/261, 276, 277

[56] References Cited

U.S. PATENT DOCUMENTS 2,738,323 3/1956 Tepas .
4,020,865 5/1977 Moffat et al. .
4,957,134 9/1990 Craig .......... 137/268
5,147,615 9/1992 Bird et al. .
5,552,079 9/1996 Roach et al. .

FOREIGN PATENT DOCUMENTS 0300819 7/1987 European Pat. Off. .
3510831 10/1986 Germany .
9413187 6/1994 WIPO .

*Primary Examiner*—Kevin Lee
*Attorney, Agent, or Firm*—Wood, Herron & Evans, L.L.P.

[57] ABSTRACT

Detergent compositions are formed into tablets for dispensing. These tablets can be retained in a flexible plastic bag having a rigid opening and tapered midsection. The rigidity of the tablets enables the bag to retain its shape and prevent hydratable detergents from clogging up the dispenser. A preferred detergent formulation is a high-caustic detergent composition which includes a combination of sodium tripolyphosphate and sodium tripolyphosphate hexahydrate, defoaming surfactant, polycarboxylate and a processing and dissolution aid such as propylene glycol. This detergent composition, when tableted, provides an extremely uniform dissolution rate minimizing any temperature peaks that can occur in dispensing high-caustic detergent.

6 Claims, 1 Drawing Sheet

TABLETED DETERGENT, METHOD OF MANUFACTURE AND USE

This application is a divisional, of application Ser. No. 08/430,177, filed on Apr. 27, 1995, U.S. Pat. No. 5,552,079.

BACKGROUND OF THE INVENTION

The institutional detergent market distributes a variety of products for washing silverware, pots and pans, dishes, floors, walls, stainless steel surfaces, tile and other areas.

Unlike products used in the home, institutional detergents are often sold in bulk and dispensed from mechanical dispensers. There are a variety of different physical forms these can take, including liquids, powders, solidified bricks, granules and tablets. Several factors enter into the determination of which particular physical form is most suitable for the desired application. Feed rate is a very important consideration. With a liquid, where the product is directly injected for use, use concentration is easy to control. Unfortunately with liquids, the concentration is generally relatively low and therefore the container size can be prohibitively large. With solid forms, which are dissolved with water, the rate of dissolution can determine feed rate.

Maintaining consistency of the product is very important. With a brick formulation, the product consistency can be maintained to a certain extent, but dissolution rate can be slow and, as with many forms, there may also be problems with disposing of the container.

Another very important factor in distributing institutional detergents is packaging. For environmental reasons, it is preferable to minimize packaging. U.S. Pat. No. 5,078,306 discloses a bag of detergent tablets wherein the bag is a water soluble material. This product is apparently designed to minimize packaging, but has several significant disadvantages. Primarily, with a water soluble bag, the water will act to dissolve the plastic bag. However, the undissolved residue of such bags tend to clog the dispenser. Also with a water soluble bag, there is the requirement of an exterior overwrap to prevent humidity or extraneous water from destroying the water soluble bag during shipping and storage.

All of these problems are compounded with highly hygroscopic (highly caustic) and/or hydratable materials. Of course, with the caustic materials, the operators should never physically handle the detergent. Powdered cleaning compounds are typically dispensed with water. Given that premature exposure to water tends to increase the caking tendency of powders, clogging of the dispenser and uniform dispensing from powder systems, especially those prone to prolonged periods of inactivity, may be a problem.

Another significant feature, with respect to hydratable detergents, is the mass and size of the detergent. If fully hydrated detergents are used in lieu of the anhydrous detergent, the mass and volume of the detergent will increase relative to the activity level. This, in turn, increases the shipping expenses. The dispenser also needs to be larger. Accordingly, it is preferable to use a detergent which has very little water of hydration.

Many detergents, particularly highly caustic detergents, dissolve in water and liberate a great deal of heat. It is therefore preferable to control the dissolution rate of these detergents to avoid temperature peaks in the dispensing equipment.

SUMMARY OF THE INVENTION

Accordingly, it is an object of the present invention to provide a method to dispense institutional detergents by dissolving solid detergent wherein the packaging is minimized, the dissolution rate is very uniform and without adversely affecting safety.

It is further an object of the present invention to provide such a detergent which is only partially hydrated with the hydration level chosen to optimize detergent activity and processing considerations. Further, it is an object of the present invention to provide a tableted detergent contained in a flexible plastic bag which permits dispensing of the tableted detergent by dissolution of the tablets while contained or partially contained in the bag.

Further, it is an object of the present invention to provide a method of manufacturing these tableted detergents to provide for a uniform mixing of all components throughout the mixture.

These objects and advantages of the present invention will be further appreciated in light of the following detailed description and drawings in which:

DETAILED DESCRIPTION

Figure 1:
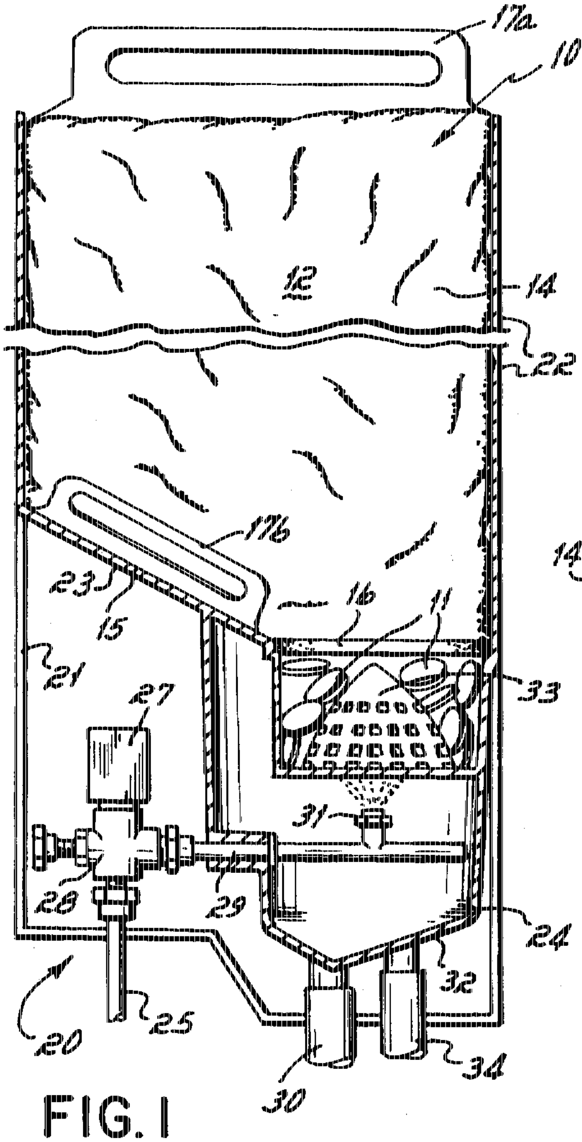
FIG. 1 is a cross-sectional view of a dispenser used according to the present invention.
Figure 2:
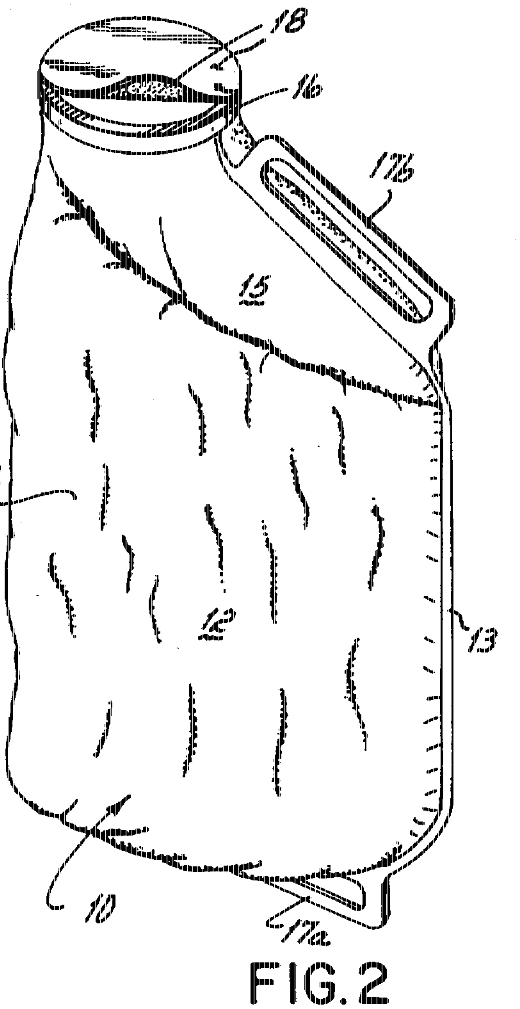
FIG. 2 is a perspective view of a bag designed to hold the tablets of the present invention.

The present invention is a tableted detergent held in a collapsible or flexible plastic bag and dispensed through a spray or jet type dispenser. The tablets of the present invention can be any detergent used in the Institutional or Industrial market. These would include but not be limited to highly caustic ware washing detergents, cutlery presoaks and dishwashing detergents, floor cleaners, sanitizers, disinfectants, de-scalers, oven grill cleaners, degreasers and rinse aids. Although these vary widely in composition, they can all be utilized beneficially in the dispenser disclosed hereinafter.

The primary advantages of the present invention are appreciated in utilizing a detergent which is formed with a high percentage (i.e., in excess of 50%) of hydratable detergent components. One such particular detergent is a high caustic ware washing detergent. For use in the present invention, this ware washing detergent will include a source of caustic, a hardness sequestering system, low molecular weight water-soluble polymers, non-ionic defoaming surfactants, processing aids and optionally bleaching sources.

For use in the present invention, the caustic source can be sodium or potassium hydroxide with sodium hydroxide preferred. Generally, for use in the present invention, this will include from about 20 to about 70% anhydrous sodium hydroxide with about 45% to about 55% anhydrous sodium hydroxide being preferred.

The hardness sequestering system can be a variety of different chemical components. These are generally selected from alkali metal salts of polyphosphates and phosphonic acid, alkali metal salts of gluconic acid, alkali metal salts of ethylene diamine tetraacetic acid, alkali metal salts of nitrilotriacetic acid and mixtures thereof.

Phosphate sequestrants are particularly useful in the present invention. These phosphates can either be hydrated or anhydrous and a mixture of anhydrous and hydrated phosphates are preferred for formulating a tablet for the present invention. The preferred anhydrous phosphate is sodium tripolyphosphate and the preferred hydrated form would be sodium tripolyphosphate hexahydrate.

Generally, the hardness sequestering system of the present invention will form 20 to about 60% of the overall mass of the detergent composition, and preferably about 35 to 40%. A mixture of hydrated (hexahydrate) and anhydrous sodium tripolyphosphate in the ratio of 1:1 to about 2:1 is preferred.

The present invention can optionally include a chlorine source. One preferred chlorine source is dichloroisocyanurate. This is added in amounts of up to 7% by weight. Other bleaching aids include the alkali metal perborates and percarbonates.

In addition to the above, the detergent composition may include defoaming agents, typically nonionic surfactants. The nonionic surfactant used herein is selected from the group consisting of alcohol alkoxylates, alkyle alkoxylates, block copolymers and mixtures thereof. Generally, these nonionic surfactants are prepared by the condensation reaction of a suitable amount of ethylene oxide and/or propylene oxide with a selected organic hydrophobic base under suitable oxyalkylation conditions. These reactions are well known and documented in the prior art. Generally, these will have a molecular weight of 900 to about 4,000. One such surfactant is an ethylene oxide propylene oxide block copolymer. Commercially available surfactants include Triton CF32, Triton DF12, Plurefac LF131, Plurefac LF132, Plurefac LF231, Industrol N3 and Genopol PN30. These can be included in an amount from about 0.5 to about 5% with about 1.5% preferred.

In addition to this, low molecular weight (2,000–20,000), water-soluble polybasic acids such as polyacrylic acid, polymaleic or polymethacrylic acid or copolymeric acids can be used as sequestering aids, to inhibit growth of calcium carbonate crystals and to improve rinseability. Preferably the water-soluble polymer will be a polycarboxylic acid such as polyacrylic acid having a molecular weight of around 5000. Generally, the present invention should include from about 1% to about 4% polyacrylic acid on a actives basis with about 2.2% preferred.

The detergent formulation should also include 1% to 5% of a polyhydric water soluble alcohol. Suitable water soluble polyhydric alcohols include propylene glycol, ethylene glycol, polyethylene glycol, glycerine, pentaerythritol, trimethylol propane, triethanolamine, tri-isopropanol amine and the like. Propylene glycol is preferred. This acts as both a processing aid and a dissolution aid for the tablet, as is discussed below.

In order to provide a strong tablet the present invention will include from about 2 to 10% liquid components, preferably less than 8%. Generally, this can be provided for by the nonionic surfactant, the polyalcohols and/or free water. The formulation should also include 2.5% to 10% by weight of water of hydration. This also provides for a stronger tablet.

In addition to the above, the detergent formulation can include optional ingredients such as soda ash, the silicates such as sodium and potassium silicate and polysilicate, and sodium metasilicate and hydrates thereof.

A preferred formulation for use in the present invention includes the following:

Solid Components

| | |
|---|---|
| 10.0% | soda ash |
| 21.0% | sodium tripolyphosphate hexahydrate (18% water of hydration) |
| 16.3% | sodium tripolyphosphate powder |
| 0.2% | sodium dichloro-isocyanurate (ACL-60) |
| 45.0% | caustic bead |

Liquid Components

| | |
|---|---|
| 4.5% | 5000 molecular weight polyacrylic acid (48% active) |
| 1.5% | ethylene oxide propylene oxide block copolymer non-ionic surfactant |
| 1.5% | propylene glycol |

In this formulation, the sodium tripolyphosphate hexahydrate provides 2.78% water of hydration and the polyacrylic acid provides about 2.3% free water.

In order to formulate the detergent of the present invention, the solid sequestrants and fillers are combined together and mixed in a ribbon or paddle blender. Thus in the preferred formula the soda ash, sodium tripolyphosphate hexahydrate, and sodium tripolyphosphate powder are combined and blended thoroughly to form a premix. Since a very low concentration of the liquid components is being added to the formulation, the liquid components should be combined prior to blending with the premix. Normally, the ethylene oxide propylene oxide block copolymer will react with the polyacrylic acid to form a solid or gel. However, mixing the propylene glycol with these two liquid components prevents this reaction.

Thus, the three liquid components, polyacrylic acid dissolved in water, the nonionic surfactant and the propylene glycol, are thoroughly mixed together and then sprayed evenly on the premix with mixing. Finally, the caustic and dichloroisocyanurate are blended with the liquid coated premix.

It is very important that the product remain flowable and non-tacky. Generally, this can be accomplished by maintaining the free water at less than 5% and the total liquid at less than 10%.

The detergent blend is then pressed to form tablets using a standard tableting machine. One such machine suitable for use in the present invention is the Stokes brand tableter. Generally, to form tablets, the powder is subjected to 4 to 10 tons pressure. Generally, the tablet will have a thickness of about 6 to 7 mm and a diameter of about 20 mm. The maximum diameter will be a function of the dispenser/feed water interface area. The tablets must be able to fall down upon the dispenser interface as disclosed hereinafter. Further, it is preferable to have tablets with a diameter to thickness ratio of at least about 3:1. If this tablet dimension ratio is significantly lower, the resistance to a tumbling style motion during transportation is too low. This tumbling motion acts to further round the tablets, ultimately yielding spheres. This necessarily generates a significant quantity of fines.

As shown in FIG. 1, the tablets 11 of the present invention are placed or carried in a bag 10 for use in a dispenser such as that shown in U.S. Pat. No. 5,147,615, the disclosure of which is incorporated herein by reference. The optimum shape and configuration of the bag will obviously vary depending on the particular dispenser. The bag disclosed herein is adapted, but not limited, to be utilized with the dispenser described.

The bag 10 itself is relatively simple in construction and includes a flexible bag wall 12 having a seam 13. The bag 10 includes an enlarged body portion 14, a tapered neck portion 15 leading to a rigid rim 16 which defines the opening which is covered with a cap 18. The bag 10 also includes a pair of handle members 17*a* and 17*b*. The bag is preferably of recyclable material, for example 10–20 mil polyethylene or polypropylene material.

The dispenser 20 includes a housing 21 which has an upper wall 22 designed to encase the bag 10 and an inner sloped portion 23 corresponding to neck portion 15 of bag 10. This leads down to a drain section 24.

Water is fed to the drain portion through water inlet 25 which is controlled by solenoid valve 27. Water pressure can be manually adjusted with valve 28. Water flows from the inlet 25 past the valve 27 through a conduit 29 leading to a nozzle 31.

Nozzle 31 is directed upwardly from collection cup 32 in the base of the housing 21. The collection cup itself includes an upper domed grid or screen 33. A drain 30 extends from the base 24. There is also an overflow drain 34.

In use, the cap 18 is removed from the rim 16 and the bag 10 is placed in the housing 21 so that the rim is resting on or slightly above grid 33. Water controlled by solenoid valve 27 is sprayed through nozzle 31 up through the grid 33 onto tablets 11 which are resting on the grid 33. Thus grid 33 acts as the water detergent contact zone or interface. The water spray will dissolve the tablets. The resulting detergent solution will then flow downwardly into the collection cup 32 through the drain 30 where it is directed to a ware washing machine for use.

Figure 3:
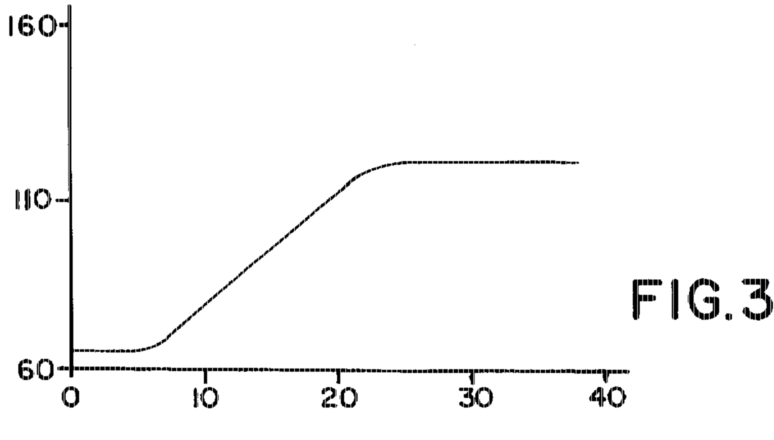
FIG. 3 is a graph showing temperature rise during dissolution.

Due to the chemical composition of this formulation with the incorporation of both the hexahydrate and the anhydrous sodium tripolyphosphate, the caustic and the addition of the polyhydric alcohol, the dissolution rate of the tablets is relatively uniform providing consistent dosage until the container is virtually empty. The rate of dissolution as manifested in temperature rise is shown in FIG. 3. This graph demonstrates a gradual dissolution of the tablet with a correspondingly gradual release of caustic and resultant temperature rise.

The container itself, being a plastic bag with a rigid plastic rim, greatly facilitates dispensing the tablets and minimizes packaging. It provides both a safe package and a collapsible package, which can be recycled. Since the detergent is nondusty and noncaking, complete emptying of the bag is promoted. This is also important for recycling as well as cost.

This bag, of course, is extremely safe, keeping the users from directly contacting the detergent. The tablets will not clog the dispenser, which can occur with some granules and plain powders, particularly hydratable detergent powders.

The particular detergent composition, in addition to providing slow, even dissolution, provides a good, well-rounded high caustic detergent composition. The method of processing this provides for uniform dispersion of the liquid components within the non-liquid components and also prevents the polyacrylate from reacting with the non-ionic surfactant. In all, this is a system that provides many unique advantages. Although several embodiments of the present invention have been disclosed, the invention itself should only be defined by the appended claims wherein

We claim:

1. A method of dispensing a detergent composition comprising:

retaining tableted detergent composition in a water-insoluble, flexible-walled plastic bag having an enlarged body portion and a neck portion leading to an orifice suspended above a screen;

said detergent composition comprising at least 40% of a nonhydrated, hydratable detergent, at least 20% of said detergent consisting of nonhydrated sodium hydroxide;

spraying water onto said tableted detergent composition to dissolve said detergent, whereby only a gradual temperature rise occurs;

directing dissolved detergent to an end use point.

2. The method claimed in claim 1 wherein said detergent comprises at least 50% of a non-hydrated hydratable detergent component.

3. The method claimed in claim 1 wherein said detergent composition comprises at least about 45% nonhydrated sodium hydroxide.

4. A method of dispensing a detergent composition comprising:

retaining tableted detergent composition in a water-insoluble, flexible plastic bag having an enlarged body portion and a neck portion leading to an orifice suspended above a screen;

spraying water onto said detergent through said screen to dissolve said detergent;

directing dissolved detergent to an end use point;

said tableted detergent composition comprising 20% to 70% caustic, 20% to 60% sequestering agent, formulated from a combination of sodium tripolyphosphate and sodium tripolyphosphate hexahydrate and 2% to 10% total liquid comprising in part a dissolution flow processing aid selected from the group consisting of water-soluble polyhydric alcohols.

5. A method of dispensing a detergent composition, said detergent composition comprising tablets having at least 20% anhydrous sodium hydroxide and at least about 50% nonhydrated, hydratable detergent components, and wherein said tablets have a reduced dissolution rate relative to powdered detergent compositions;

supporting said tablets in a thin-walled, flexible plastic container;

spraying water onto said tablets in said container to dissolve said tablets and form a detergent solution;

directing said detergent solution to an end-use location whereby the reduced dissolution rate of said tablets is controlled to prevent an excessive temperature rise in said thin-walled, flexible plastic container.

6. The method claimed in claim 5 wherein said detergent composition comprises at least about 45% anhydrous sodium hydroxide.

* * * * *